U S009223898B2

(12) United States Patent
Li

(10) Patent No.: US 9,223,898 B2
(45) Date of Patent: Dec. 29, 2015

(54) FILTERING SUGGESTED STRUCTURED QUERIES ON ONLINE SOCIAL NETWORKS

(71) Applicant: Xiao Li, Sunnyvale, CA (US)

(72) Inventor: Xiao Li, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 349 days.

(21) Appl. No.: 13/890,070

(22) Filed: May 8, 2013

(65) Prior Publication Data

US 2014/0337371 A1 Nov. 13, 2014

(51) Int. Cl.
*G06F 17/30* (2006.01)
(52) U.S. Cl.
CPC ................................ *G06F 17/30958* (2013.01)
(58) Field of Classification Search
USPC .......................................... 707/769, 767, 765
See application file for complete search history.

(56) References Cited

U.S. PATENT DOCUMENTS

| 6,957,184 | B2 | 10/2005 | Schmid |
| 6,983,239 | B1 | 1/2006 | Epstein |
| 7,752,326 | B2 | 7/2010 | Smit |
| 7,836,044 | B2 | 11/2010 | Kamvar |
| 8,060,639 | B2 | 11/2011 | Smit |
| 8,112,529 | B2 | 2/2012 | Smit |
| 8,185,558 | B1 * | 5/2012 | Narayanan et al. ............ 707/798 |
| 8,239,364 | B2 | 8/2012 | Wable |
| 8,271,471 | B1 | 9/2012 | Kamvar |
| 8,271,546 | B2 | 9/2012 | Gibbs |
| 8,321,364 | B1 | 11/2012 | Gharpure |
| 8,364,709 | B1 | 1/2013 | Das |
| 8,386,465 | B2 | 2/2013 | Ansari |
| 8,407,200 | B2 | 3/2013 | Wable |
| 8,412,749 | B2 | 4/2013 | Fortuna |
| 8,538,960 | B2 | 9/2013 | Wong |
| 8,595,297 | B2 | 11/2013 | Marcucci |
| 8,601,027 | B2 | 12/2013 | Behforooz |
| 8,949,250 | B1 * | 2/2015 | Garg et al. .................... 707/748 |
| 2004/0172237 | A1 * | 9/2004 | Saldanha et al. ................. 704/4 |
| 2007/0277100 | A1 | 11/2007 | Sheha |
| 2009/0006543 | A1 | 1/2009 | Smit |
| 2009/0055380 | A1 | 2/2009 | Peng |
| 2009/0171929 | A1 | 7/2009 | Jing |
| 2009/0228296 | A1 | 9/2009 | Ismalon |
| 2009/0281988 | A1 | 11/2009 | Yoo |
| 2010/0185643 | A1 | 7/2010 | Rao |
| 2011/0078166 | A1 | 3/2011 | Oliver |
| 2011/0087534 | A1 | 4/2011 | Strebinger |
| 2011/0196855 | A1 * | 8/2011 | Wable et al. .................. 707/711 |
| 2012/0278127 | A1 | 11/2012 | Kirakosyan |
| 2012/0284329 | A1 | 11/2012 | van den Oord |
| 2012/0311034 | A1 | 12/2012 | Goldband |

(Continued)

OTHER PUBLICATIONS

Pynadath, David et al., "*Generalized Queries on Probabilistic Context-Free Grammars*"; IEEE Transactions on Pattern Analysis and Machine Intelligence, vol. 20, No. 1, Jan. 1998.

(Continued)

*Primary Examiner* — Debbie Le
(74) *Attorney, Agent, or Firm* — Baker Botts L.L.P.

(57) ABSTRACT

In one embodiment, a method includes accessing a social graph comprising a plurality of nodes and a plurality of edges connecting the nodes, receiving from a user an unstructured text query, generating a set of structured queries based on the text query, calculating a quality score based on the text query and the structured query for each structured query in the set, and filtering the set to remove each structured query having a quality score less than a threshold score.

20 Claims, 6 Drawing Sheets

(56) References Cited

U.S. PATENT DOCUMENTS

| | | |
|---|---|---|
| 2013/0031106 A1 | 1/2013 | Schechter |
| 2013/0031113 A1* | 1/2013 | Feng et al. .................. 707/755 |
| 2013/0041876 A1 | 2/2013 | Dow |
| 2013/0066876 A1 | 3/2013 | Raskino |
| 2013/0086057 A1 | 4/2013 | Harrington |

OTHER PUBLICATIONS

Grune, Dick et al., "*Parsing Techniques, A Practical Guide*"; Monographs in Computer Science, 2nd Edition, 2008.

U.S. Appl. No. 13/674,695, filed Nov. 12, 2012, Lee.

International Search Report and Written Opinion for International Application PCT/US2014/036772, Sep. 5, 2014.

* cited by examiner

FILTERING SUGGESTED STRUCTURED QUERIES ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, in response to a text query received from a user, a social-networking system may generate structured queries comprising query tokens that correspond to identified social-graph elements. By providing suggested structured queries in response to a user's text query, the social-networking system may provide a powerful way for users of an online social network to search for elements represented in a social graph based on their social-graph attributes and their relation to various social-graph elements.

In particular embodiments, the social-networking system may receive an unstructured text query from a user. In response, the social-networking system may parse the text query and generate one or more structured queries based on the text query. These structured queries may then be filtered based on the quality of each structured query. When parsing certain unstructured text queries, the social-networking system may generate low-quality or irrelevant structured queries in response. This may happen when the text query contains terms that do not match well with the grammar model, such that when the term is parsed by the grammar model, it is matched to irrelevant query tokens. Since these low-quality structured queries may be ridiculous or embarrassing, and may be desirable to filter out these queries before they are sent back to the querying user as suggestions. Filtering may be done by analyzing and scoring each structured based on a variety of factors that signal a particular suggested query may be of low-quality or irrelevant. Each structured query may be scored based on the text query itself and the structured query. Structured queries having a poor quality score may be filtered out, such that only high-quality structured queries are presented to the querying user. The structured queries remaining after filtering may then be transmitted and displayed to the user, where the user can then select an appropriate query to search for the desired content.

DESCRIPTION OF EXAMPLE EMBODIMENTS

System Overview

Figure 1:
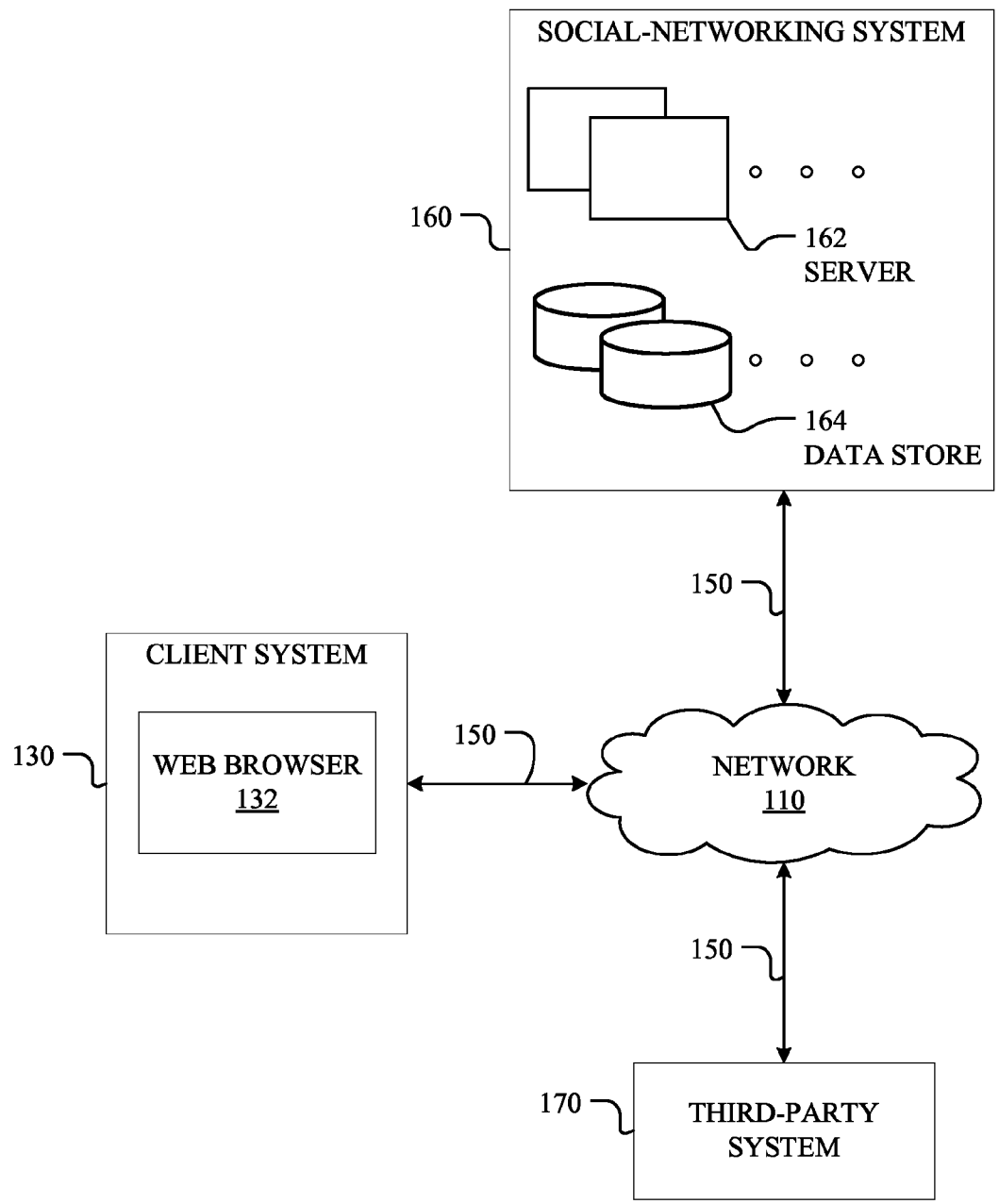
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
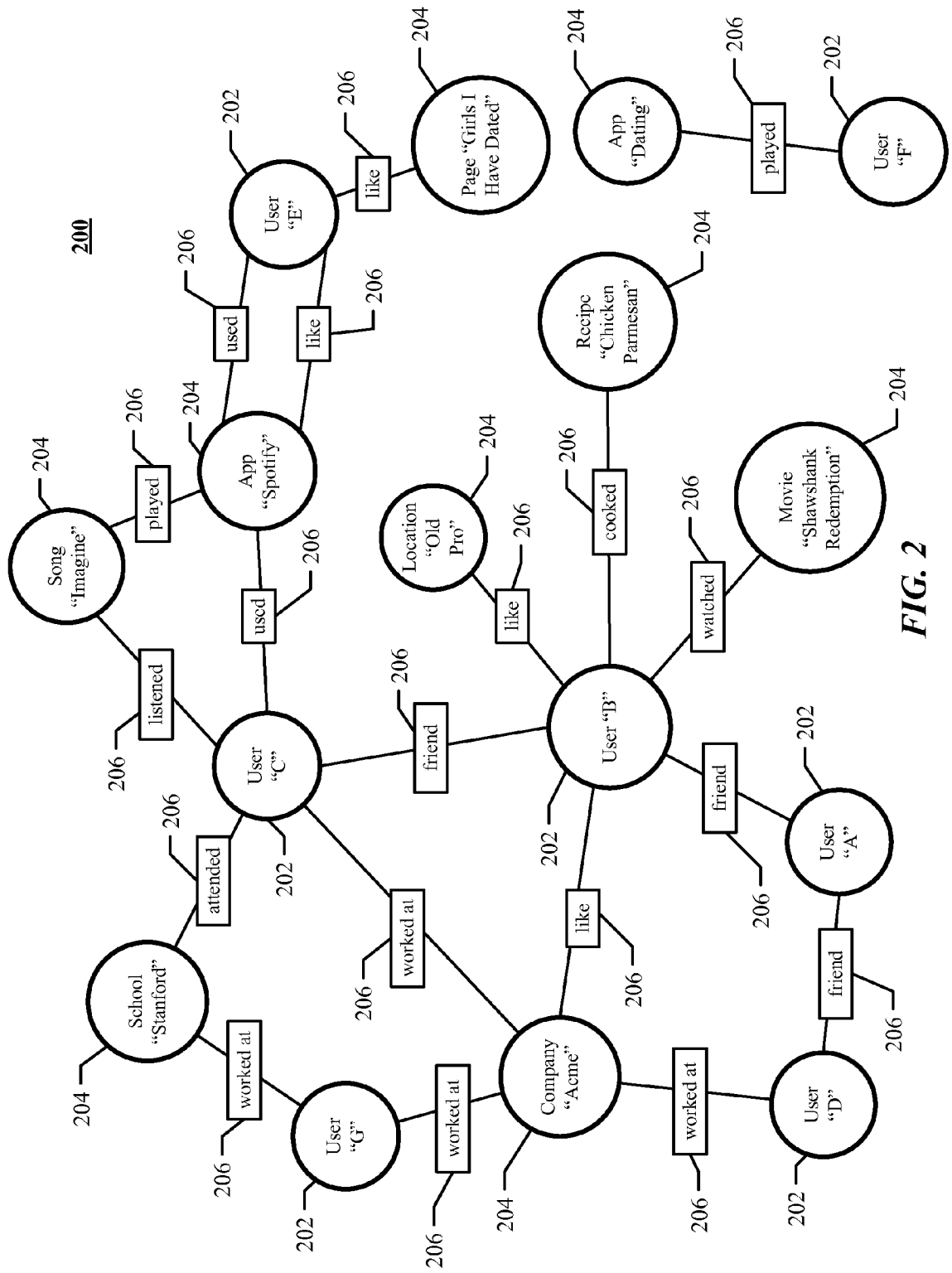
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Typeahead Processes

In particular embodiments, one or more client-side and/or backend (server-side) processes implement and utilize a "typeahead" feature to automatically attempt to match concepts corresponding to respective existing user nodes 202 or concept nodes 204 to information currently being entered by a user in an input form rendered in conjunction with a requested webpage, such as a user-profile page, which may be hosted or accessible in, by social-networking system 160. In particular embodiments, as a user is entering text to make a declaration, the typeahead feature attempts to match the string of textual characters being entered in the declaration to strings of characters (e.g., names) corresponding to existing concepts (or users) and corresponding concept (or user) nodes in the social graph 200. In particular embodiments, when a match is found, the typeahead feature may automatically populate the form with a reference to the node (such as, for example, the node name, node ID, or another suitable reference or identifier) of the existing node.

In particular embodiments, as a user types or otherwise enters text into a form used to add content or make declarations in various sections of the user's profile page or other page, the typeahead process may work in conjunction with one or more frontend (client-side) and/or backend (server-side) typeahead processes (hereinafter referred to simply as "typeahead process") executing at (or within) social-networking system 160 (e.g., within servers 162), to interactively and virtually instantaneously (as appearing to the user) attempt to auto-populate the form with a term or terms corresponding to names of existing social-graph entities, or terms associated with existing social-graph entities, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, are able to predict a user's intended declaration with a high degree of precision. However, social-networking system 160 also provides user's with the freedom to enter any declaration they wish enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the frontend-typeahead process may transmit the entered character string as a request (or call) to the backend-typeahead process executing within social-networking system 160. In particular embodiments, the typeahead processes may communicate via AJAX (Asynchronous JavaScript and XML) or other suitable techniques, and particularly, asynchronous techniques. In one particular embodiment, the request is, or comprises, an XMLHTTPRequest (XHR) enabling quick and dynamic sending and fetching of results. In particular embodiments, the typeahead process also transmits before, after, or with the request a section identifier (section ID) that identifies the particular section of the particular page in which the user is making the declaration. In particular embodiments, a user ID parameter may also be sent, but this may be unnecessary in some embodiments, as the user is already "known" based on he or she logging into social-networking system 160.

In particular embodiments, the typeahead process may use one or more matching algorithms to attempt to identify matching social-graph elements. In particular embodiments, when a match or matches are found, the typeahead process may transmit a response (which may utilize AJAX or other suitable techniques) to the user's client system 130 that may include, for example, the names (name strings) of the matching social-graph elements as well as, potentially, other metadata associated with the matching social-graph elements. As an example and not by way of limitation, if a user entering the characters "dat" into a query field, the typeahead process may display a drop-down menu that displays names of matching existing profile pages and respective user nodes 202 or concept nodes 204 (e.g., a profile page named or devoted to "dating"), which the user can then click on or otherwise select thereby confirming the desire to declare the matched user or concept name corresponding to the selected node. As another example and not by way of limitation, upon clicking "dating," the typeahead process may auto-populate, or causes the web browser 132 to auto-populate, the query field with the declaration "Dating". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

Structured Search Queries

Figure 3:
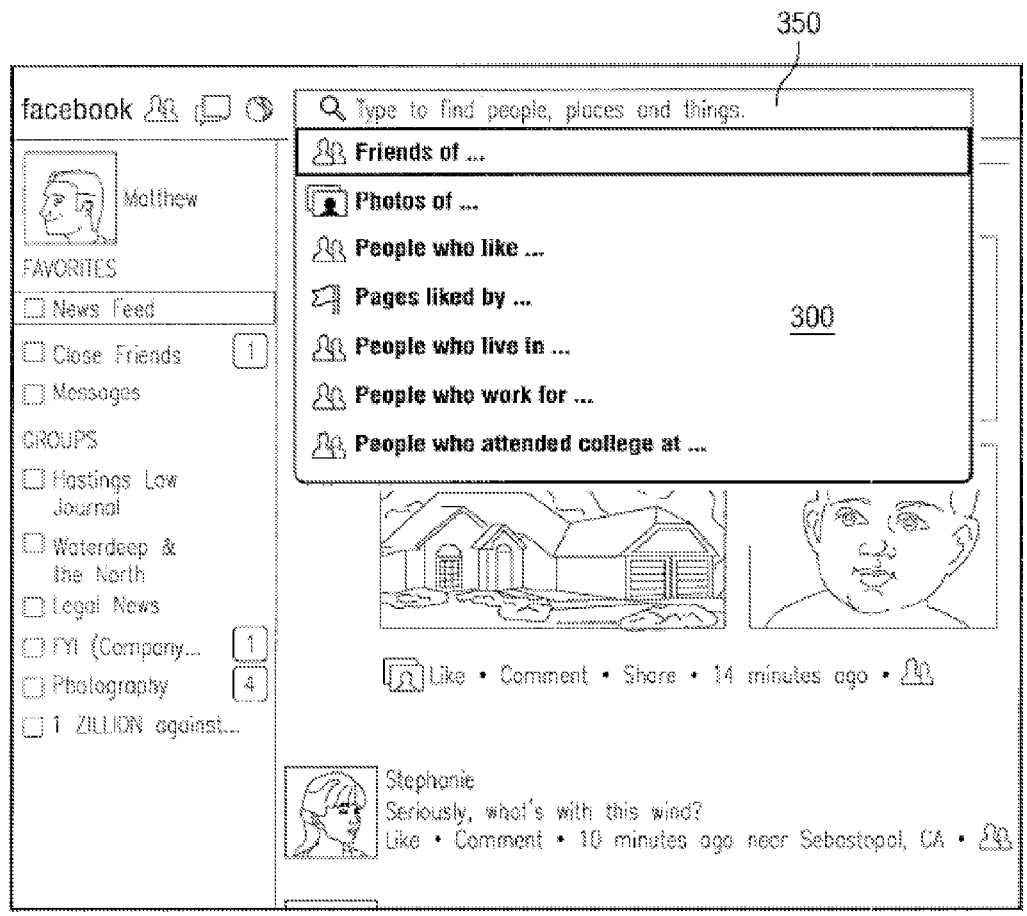
FIG. 3 illustrates an example webpage of an online social network.

FIG. 3 illustrates an example webpage of an online social network. In particular embodiments, a user may submit a query to the social-network system 160 by inputting a text query into query field 350. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings or one or more n-grams. In general, a user may input any character string into query field 350 to search for content on social-networking system 160 that matches the text query. Social-networking system 160 may then search a data store 164 (or, more particularly, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or transmit a search query to the search engine. In response, the search engine may identify one or more resources that are likely to be related to the search query, which may collectively be referred to as a "search result" identified for the search query. The identified content may include, for example, social-graph entities (i.e., user nodes 202, concept nodes 204, edges 206), profile pages, external webpages, or any combination thereof. Social-networking system 160 may then generate a search results webpage with search results corresponding to the identified content. The search results may be presented to the user, often in the form of a list of links on search-results webpage, each link being associated with a different webpage that contains some of the identified resources or content. In particular embodiments, each link in the search results may be in the form of a Uniform Resource Locator (URL) that specifies where the corresponding webpage is located and the mechanism for retrieving it. Social-networking system 160 may then transmit the search results webpage to the user's web browser 132 on the user's client system 130. The user may then click on the URL links or otherwise select the content from the search results webpage to access the content from social-networking system 160 or from an external system, as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying social-networking system 160 in a particular manner, this disclosure contemplates querying social-networking system 160 in any suitable manner.

In particular embodiments, the typeahead processes described herein may be applied to search queries entered by a user. As an example and not by way of limitation, as a user enters text characters into a search field, a typeahead process may attempt to identify one or more user nodes 202, concept nodes 204, or edges 206 that match the string of characters entered search field as the user is entering the characters. As the typeahead process receives requests or calls including a string or n-gram from the text query, the typeahead process may perform or causes to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may transmit a response to the user's client system 130 that may include, for example, the names (name strings) of the matching nodes as well as, potentially, other metadata associated with the matching nodes. The typeahead process may then display a drop-down menu 300 that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu 300. The user may then confirm the auto-populated declaration simply by keying "enter" on a keyboard or by clicking on the auto-populated declaration. Upon user confirmation of the matching nodes and edges, the typeahead process may transmit a request that informs social-networking system 160 of the user's confirmation of a query containing the matching social-graph elements. In response to the request transmitted, social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Parsing Text Queries and Rendering Structured Queries

Figure 4A:
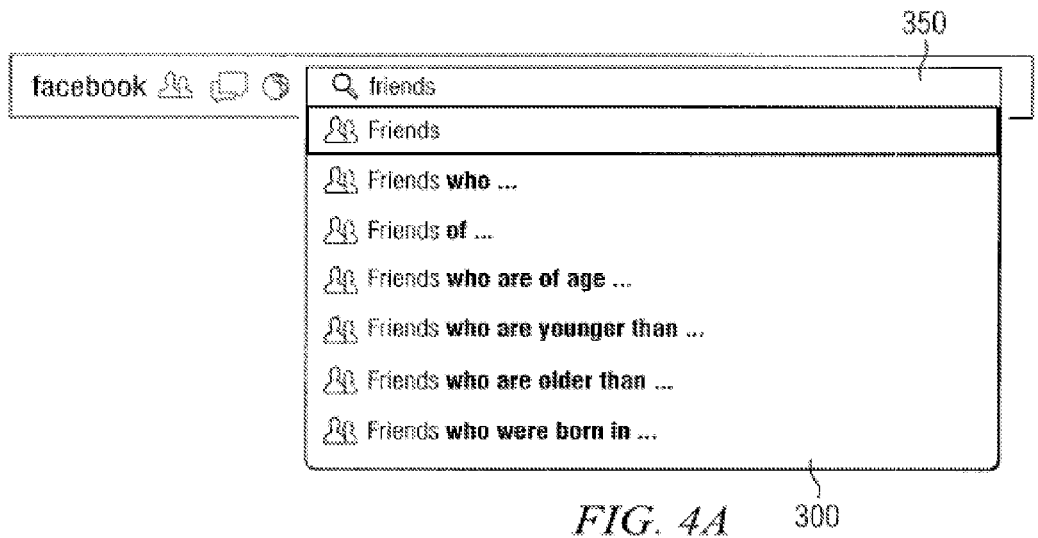
FIGS. 4A-4B illustrate example queries of the online social network.
Figure 4B:
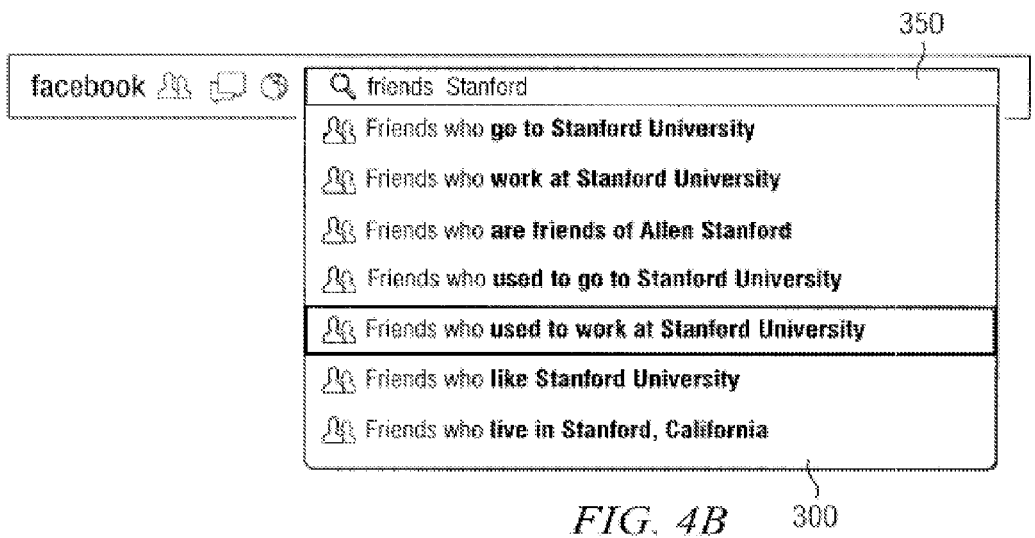

FIGS. 4A-4B illustrate example queries of the online social network. In particular embodiments, in response to a text query received from a first user (i.e., the querying user), social-networking system 160 may generate one or more structured queries rendered in a natural-language syntax, where each structured query includes query tokens that correspond to one or more identified social-graph elements. A natural-language structured query may be generated using a context-free grammar model. These structured queries may be based on strings generated by the grammars of the grammar model, such that they are rendered with references to the appropriate social-graph elements using a natural-language syntax. The structured queries may be transmitted to the first user and displayed in a drop-down menu 300 (via, for example, a client-side typeahead process), where the first user can then select an appropriate query to search for the desired content. FIGS. 4A-4B illustrate various example text queries in query field 350 and various structured queries generated in response in drop-down menus 300. By providing suggested structured queries in response to a user's text query, social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge types. Although this disclosure describes and FIGS. 4A-4B illustrate generating particular structured queries in a particular manner, this disclosure contemplates generating any suitable structured queries in any suitable manner. More information on parsing queries, grammar models, and generating structured queries may be found in U.S. patent application Ser. No. 13/556,060, filed 23 Jul. 2012, U.S. patent application Ser. No. 13/674,695, filed 12 Nov. 2012, U.S. patent application Ser. No. 13/731,866, filed 31 Dec. 2012, and U.S. patent application Ser. No. 13/732,175, filed 31 Dec. 2012, each of which is incorporated by reference herein.

In particular embodiments, social-networking system 160 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into query field 350, as illustrated in FIGS. 4A-4B. As the first user enters this text query into query field 350, social-networking system 160 may provide various suggested structured queries, as illustrated in drop-down menus 300. As used herein, an unstructured text query refers to a simple text string inputted by a user. The text query may, of course, be structured with respect to standard language/grammar rules (e.g. English language grammar). However, the text query will ordinarily be unstructured with respect to social-graph elements. In other words, a simple text query will not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query will not necessarily be in the format of a query command that is directly executable by a search engine. Although this disclosure describes receiving particular queries in a particular manner, this disclosure contemplates receiving any suitable queries in any suitable manner.

In particular embodiments, social-networking system 160 may parse the unstructured text query (also simply referred to as a search query) received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. An n-gram of size one can be referred to as a "unigram," of size two can be referred to as a "bigram" or "digram," of size three can be referred to as a "trigram," and so on. Each n-gram may include one or more parts from the text query received from the querying user. In particular embodiments, each n-gram may comprise a character string (e.g., one or more characters of text) entered by the first user. As an example and not by way of limitation, social-networking system 160 may parse the text query "friends stanford" to identify the following n-grams: friends; stanford; friends stanford. As another example and not by way of limitation, social-networking system 160 may parse the text query "friends in palo alto" to identify the following n-grams: friends; in; palo; alto; friends in; in palo; palo alto; friend in palo; in palo also; friends in palo alto. In particular embodiments, each n-gram may comprise a contiguous sequence of n items from the text query. Although this disclosure describes parsing particular queries in a particular manner, this disclosure contemplates parsing any suitable queries in any suitable manner.

In particular embodiments, social-networking system 160 may determine or calculate, for each n-gram identified in the text query, a score that the n-gram corresponds to a social-graph element. The score may be, for example, a confidence score, a probability, a quality, a ranking, another suitable type of score, or any combination thereof. As an example and not by way of limitation, social-networking system 160 may determine a probability score (also referred to simply as a "probability") that the n-gram corresponds to a social-graph element, such as a user node 202, a concept node 204, or an edge 206 of social graph 200. The probability score may indicate the level of similarity or relevance between the n-gram and a particular social-graph element. There may be many different ways to calculate the probability. The present disclosure contemplates any suitable method to calculate a probability score for an n-gram identified in a search query. In particular embodiments, social-networking system 160 may determine a probability, p, that an n-gram corresponds to a particular social-graph element. The probability, p, may be calculated as the probability of corresponding to a particular social-graph element, k, given a particular search query, X. In other words, the probability may be calculated as p=(k|X). As an example and not by way of limitation, a probability that an n-gram corresponds to a social-graph element may calculated as an probability score denoted as $p_{i,j,k}$. The input may be a text query $X=(x_1, x_2, \ldots, x_N)$, and a set of classes. For each (i:j) and a class k, social-networking system 160 may compute $p_{i,j,k}$=p(class($x_{i:j}$)=k|X). In particular embodiments, the identified social-graph elements may be used to generate a query command that is executable by a search engine. The query command may be a structured semantic query with defined functions that accept specific arguments. As an example and not by way of limitation, the text query "friend me mark" could be parsed to form the query command: intersect(friend(me), friend(Mark)). In other words, the query is looking for nodes in the social graph that intersect the querying user ("me") and the user "Mark" (i.e., those user nodes 202 that are connected to both the user node 202 of the querying user by a friend-type edge 206 and the user node 202 for the user "Mark" by a friend-type edge 206). Although this disclosure describes determining whether n-grams correspond to social-graph elements in a particular manner, this disclosure contemplates determining whether n-grams correspond to social-graph elements in any suitable manner. Moreover, although this disclosure describes determining whether an n-gram corresponds to a social-graph element using a particular type of score, this disclosure contemplates determining whether an n-gram corresponds to a social-graph element using any suitable type of score.

In particular embodiments, social-networking system 160 may identify one or more edges 206 having a probability greater than an edge-threshold probability. Each of the identified edges 206 may correspond to at least one of the n-grams. As an example and not by way of limitation, the n-gram may only be identified as corresponding to an edge, k, if $p_{i,j,k}$> $p_{edge\ threshold}$. Furthermore, each of the identified edges 206 may be connected to at least one of the identified nodes. In other words, social-networking system 160 may only identify edges 206 or edge-types that are connected to user nodes 202 or concept nodes 204 that have previously been identified as corresponding to a particular n-gram. Edges 206 or edge-types that are not connected to any previously identified node are typically unlikely to correspond to a particular n-gram in a search query. By filtering out or ignoring these edges 206 and edge-types, social-networking system 160 may more efficiently search the social graph 200 for relevant social-graph elements. Although this disclosure describes identifying edges 206 that correspond to n-grams in a particular manner, this disclosure contemplates identifying edges 206 that correspond to n-grams in any suitable manner.

In particular embodiments, social-networking system 160 may identify one or more user nodes 202 or concept nodes 204 having a probability greater than a node-threshold probability. Each of the identified nodes may correspond to at least one of the n-grams. As an example and not by way of limitation, the n-gram may only be identified as corresponding to a node, k, if $p_{i,j,k}$>$p_{node-threshold}$. Furthermore, each of the identified user nodes 202 or concept nodes 204 may be connected to at least one of the identified edges 206. In other words, social-networking system 160 may only identify nodes or nodes-types that are connected to edges 206 that have previously been identified as corresponding to a particular n-gram. Nodes or node-types that are not connected to any previously identified edges 206 are typically unlikely to correspond to a particular n-gram in a search query. By filtering out or ignoring these nodes and node-types, social-networking system 160 may more efficiently search the social graph 200 for relevant social-graph elements. Although this disclosure describes identifying nodes that correspond to n-grams in a particular manner, this disclosure contemplates identifying nodes that correspond to n-grams in any suitable manner.

In particular embodiments, social-networking system 160 may access a context-free grammar model comprising a plurality of grammars. Each grammar of the grammar model may comprise one or more non-terminal tokens (or "non-terminal symbols") and one or more terminal tokens (or "terminal symbols"/"query tokens"), where particular non-terminal tokens may be replaced by terminal tokens. A grammar model is a set of formation rules for strings in a formal language. In particular embodiments, the plurality of grammars may be visualized as a grammar forest organized as an ordered tree, with the internal nodes corresponding to non-terminal tokens and the leaf nodes corresponding to terminal tokens. Each grammar may be represented as a sub-tree within the grammar forest, where the grammars are adjoining each other via non-terminal tokens. Thus, two or more grammars may be a sub-forest within the grammar forest. Although this disclosure describes accessing particular grammars, this disclosure contemplates any suitable grammars.

In particular embodiments, social-networking system 160 may generate one or more strings using one or more grammars. To generate a string in the language, one begins with a string consisting of only a single start symbol. The production rules are then applied in any order, until a string that contains neither the start symbol nor designated non-terminal symbols is produced. In a context-free grammar, the production of each non-terminal symbol of the grammar is independent of what is produced by other non-terminal symbols of the grammar. The non-terminal symbols may be replaced with terminal symbols (i.e., terminal tokens or query tokens). Some of the query tokens may be social-graph tokens, which may correspond to identified nodes or identified edges, as described previously. A string generated by the grammar may then be used as the basis for a structured query containing references to the identified nodes or identified edges. The string generated by the grammar may be rendered in a natural-language syntax, such that a structured query based on the string is also rendered in natural language. A context-free grammar is a grammar in which the left-hand side of each production rule consists of only a single non-terminal symbol. A probabilistic context-free grammar is a tuple $\langle \Sigma, N, S, P \rangle$, where the disjoint sets $\Sigma$ and N specify the terminal and non-terminal symbols, respectively, with S$\in$N being the start symbol. P is the set of productions, which take the form E→ξ(p), with E$\in$N, ξ$\in(\Sigma \cup N)^+$, and p=Pr(E→ξ), the probability that E will be expanded into the string ξ. The sum of probabilities p over all expansions of a given non-terminal E must be one. Although this disclosure describes generating strings in a particular manner, this disclosure contemplates generating strings in any suitable manner.

In particular embodiments, social-networking system 160 may identify one or more query tokens corresponding to the previously identified nodes and edges. In other words, if an identified node or identified edge may be used as a query token in a particular grammar, that query token may be identified by social-networking system 160. Query tokens may include grammar tokens or social-graph tokens. A grammar token is a query token corresponding to text inserted to render in a natural-language syntax. A social-graph token is a query token corresponding to a particular node or edge of social graph 200. As an example and not by way of limitation, an example grammar may be: [user][user-filter][school]. The non-terminal symbols [user], [user-filter], and [school] could then be determined based n-grams in the received text query. For the text query "friends stanford", this query could be parsed by using the grammar as, for example, "[friends][who][go to][Stanford University]" or "[friends][who][work at][Stanford University]". In this example, the query tokens [friends], [go to], [work at], and [Stanford University] may all be social-graph tokens that correspond to particular nodes and edges of social-graph 200. Similarly, the query token [who] may be a grammar token, which was inserted by the grammar in order to render the structured query in a natural-language syntax. In both the example cases above, if the n-grams of the received text query could be used as query tokens, then these query tokens may be identified by social-networking system 160. Although this disclosure describes identifying particular query tokens in a particular manner, this disclosure contemplates identifying any suitable query tokens in any suitable manner.

In particular embodiments, social-networking system 160 may select one or more grammars having at least one query token corresponding to each of the previously identified nodes and edges. Only particular grammars may be used depending on the n-grams identified in the text query. So the terminal tokens of all available grammars should be examined to find those that match the identified n-grams from the text query. In other words, if a particular grammar can use all of the identified nodes and edges as query tokens, that grammar may be selected by social-networking system 160 as a possible grammar to use for generating a structured query. This is effectively a type of bottom-up parsing, where the possible query tokens are used to determine the applicable grammar to apply to the query. As an example and not by way of limitation, for the text query "friends stanford", the social-networking system may identify the query tokens of [friends] and [Stanford University]. Terminal tokens of the grammars from the grammar model may be identified, as previously discussed. Any grammar that is able to use both the [friends] and the [Stanford University] tokens may then be selected. For example, the grammar [user][user-filter][school] may be selected because this grammar could use the [friends] and the [Stanford University] tokens as query tokens, such as by forming the strings "friends who go to Stanford University" or "friends who work at Stanford University". Thus, if the n-grams of the received text query could be used as query tokens in the grammars, then these grammars may be selected by social-networking system 160. Similarly, if the received text query comprises n-grams that could not be used as query tokens in the grammar, that grammar may not be selected. Although this disclosure describes selecting particular grammars in a particular manner, this disclosure contemplates selecting any suitable grammars in any suitable manner.

In particular embodiments, social-networking system 160 may select one or more grammars by analyzing a grammar forest formed by a plurality of grammars. The grammar forest may be organized as an ordered tree comprising a plurality of non-terminal tokens and a plurality of terminal tokens. Each grammar may be represented as a sub-tree within the grammar forest, and each sub-tree may adjoin other sub-trees via one or more additional non-terminal tokens. As an example and not by way of limitation, social-networking system 160 may start by identifying all the terminal tokens (i.e., query tokens) in the grammar forest that correspond to identified nodes and edges corresponding to portions of a text query. Once these query tokens in the grammar forest have been identified, social-networking system 160 may then traverse the grammar forest up from each of these query tokens to identify one or more intersecting non-terminal tokens. Once a non-terminal token has been identified where paths from all the query tokens intersect, that intersecting non-terminal token may be selected, and the one or more grammars adjoined to that intersecting non-terminal token in the grammar forest may then be selected. Although this disclosure describes selecting grammars in a particular manner, this disclosure contemplates selecting grammars in any suitable manner.

In particular embodiments, social-networking system 160 may generate a semantic tree corresponding to the text query from the querying user. The semantic tree may include each identified query token that corresponds to a previously identified node or edge, and may also include an intersect token. The semantic tree may also include non-terminal tokens as appropriate connecting the query tokens to the intersect token. As an example and not by way of limitation, the text query "friends stanford" may be parsed into the query command (intersect(school:<Stanford University>, friends_of:<me>)). In other words, the query is looking for nodes in the social graph that intersect both friends of the querying user ("me") (i.e., those user nodes 202 that are connected to the user node 202 of the querying user by a friend-type edge 206) and the concept node 204 for Stanford University. Although this disclosure describes generating particular semantic trees in a particular manner, this disclosure contemplates generating any suitable semantic trees in any suitable manner.

In particular embodiments, social-networking system 160 may analyze a grammar forest comprising a plurality of grammars to identify one or more sets of non-terminal tokens and query tokens that substantially match a semantic tree corresponding to a query, where each set has a non-terminal token corresponding to the intersect token of the semantic tree. Social-networking system 160 may then select one or more of the grammars in the grammar forest adjoining the non-terminal token corresponding to the intersect token. The algorithm will attempt to find the lowest-cost multi-path in the grammar forest that leads to an intersect token, and the intersect token corresponding to this lowest-cost multi-path may be preferentially selected over other intersect tokens (if any). Although this disclosure describes analyzing particular grammar forests in a particular manner, this disclosure contemplates analyzing any suitable grammar forests in any suitable manner.

In particular embodiments, social-networking system 160 may determine a score for each selected grammar. The score may be, for example, a confidence score, a probability, a quality, a ranking, another suitable type of score, or any combination thereof. The score may be based on the individual scores or probabilities associated with the query tokens used in the selected grammar. A grammar may have a higher relative score if it uses query tokens with relatively higher individual scores. In particular embodiments, social-networking system 160 may determine a score for a selected grammar based on social-graph affinity. Affinity may represent the strength of a relationship or level of interest between particular objects associated with the online social network, such as users, concepts, content, actions, advertisements, other objects associated with the online social network, or any suitable combination thereof. Grammars with query tokens corresponding to social-graph elements having a higher affinity with respect to the querying user may be scored more highly than grammars with query tokens corresponding to social-graph elements having a lower affinity with respect to the querying user. In particular embodiments, social-networking system 160 may determine a score for a selected grammar based on the lengths of the paths traversed in order to identify the intersect token corresponding to the selected grammar. Grammars with lower-cost multi-paths (i.e., shorter paths) may be scored more highly than grammars with high-cost multi-paths (i.e., longer paths). In particular embodiments, social-networking system 160 may determine a score for a selected grammar based on advertising sponsorship. An advertiser (such as, for example, the user or administrator of a particular profile page corresponding to a particular node) may sponsor a particular node such that a grammar that includes a query token referencing that sponsored node may be scored more highly. Although this disclosure describes determining particular scores for particular grammars in a particular manner, this disclosure contemplates determining any suitable scores for any suitable grammars in any suitable manner. In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, social-networking system 160 may select one or more grammars having a score greater than a grammar-threshold score. Each of the selected grammars may contain query tokens that correspond to each of the identified nodes or identified edges (which correspond to n-grams of the received text query). In particular embodiments, the grammars may be ranked based on their determined scores, and only grammars within a threshold rank may be selected (e.g., top seven). Although this disclosure describes selecting grammars in a particular manner, this disclosure contemplates selecting grammars in any suitable manner.

In particular embodiments, social-networking system 160 may generate one or more structured queries corresponding to the selected grammars (e.g., those grammars having a score greater than a grammar-threshold score). Each structured query may be based on a string generated by the corresponding selected grammar. As an example and not by way of limitation, in response to the text query "friends stanford", the grammar [user][user-filter][school] may generate a string "friends who go to Stanford University", where the non-terminal tokens [user], [user-filter], [school] of the grammar have been replaced by the terminal tokens [friends], [who go to], and [Stanford University], respectively, to generate the string. In particular embodiments, a string that is generated by grammar using a natural-language syntax may be rendered as a structured query in natural language. As an example and not by way of limitation, the structured query from the previous example uses the terminal token [who go to], which uses a natural-language syntax so that the string rendered by grammar is in natural language. The natural-language string generated by a grammar may then be rendered to form a structured query by modifying the query tokens corresponding to social-graph element to include references to those social-graph elements. As an example and not by way of limitation, the string "friends who go to Stanford University" may be rendered so that the query token for "Stanford University" appears in the structured query as a reference to the concept node 204 corresponding to the school "Stanford University", where the reference may be include highlighting, an inline link, a snippet, another suitable reference, or any combination thereof. Each structured query may comprise query tokens corresponding to the corresponding selected grammar, where these query tokens correspond to one or more of the identified edges 206 and one or more of the identified nodes. Generating structured queries is described more below.

Generating and Filtering Structured Search Queries

In particular embodiments, social-networking system 160 may generate a set of structured queries based on the text query received from the querying user. The generated structured queries may be based on natural-language strings generated by one or more context-free grammars, as described previously. Each structured query may comprise query tokens from the corresponding grammar. The query tokens may be social-graph tokens corresponding to one or more of the identified user nodes 202 or one or more of the identified edges 206. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (i.e., a user node 202 corresponding to the user "Stephanie", which is connected to a user node 202 of the querying user by a in-relationship-type edge 206), while the reference to "friends" would correspond to "friend" edges 206 connecting that user node 202 to other user nodes 202 (i.e., edges 206 connecting to "Stephanie's" first-degree friends). In particular embodiments, social-networking system 160 may filter the set of structured queries generated in response to the text query based on the quality of each structured query. When parsing certain unstructured text queries, social-networking system 160 may generate low-quality or irrelevant structured queries in response. This may happen when the text query contains terms that do not match well with the grammar model, such that when the term is parsed by the grammar model, it is matched to irrelevant query tokens. As an example and not by way of limitation, a text query for "tall people" might not generate any relevant structured queries because the terms may not be parsed well by the grammar model if these terms do not match any query tokens used in the grammar model (e.g., the terms to not match any social-graph elements), or possibly only have low-quality matches (e.g., a low-quality match may be a structured query referencing a page or group named "Tall People!"). These low-quality suggested queries may be ridiculous or embarrassing, may contain query tokens that false matches or are irrelevant, or may simply not match with the query intent of the user. Regardless, it may be desirable to filter out these structured queries before they are sent to the querying user as suggested queries. In order to avoid sending such queries to the user as suggestions, each structured query may be analyzed and scored based on a variety of factors that signal a particular suggested query may be of low-quality or irrelevant. Each structured query in the set generated by social-networking system 160 may be scored based on the text query itself and the structured query. Structured queries having a poor quality score may be filtered out, such that only high-quality structured queries are presented to the querying user. Although this disclosure describes generating particular structured queries in a particular manner, this disclosure contemplates generating any suitable structured queries in any suitable manner.

In particular embodiments, social-networking system 160 may generate a set of structured queries based on a text query received from a user of the online social network. Each structured query may comprise one or more query tokens, which may be grammar tokens or social-graph tokens corresponding to the identified concept nodes 204 and one or more of the identified edges 206. These structured queries may allow the social-networking system 160 to more efficiently search for resources and content related to the online social network (such as, for example, profile pages) by searching for content objects connected to or otherwise related to the identified concept nodes 204 and the identified edges 206. As an example and not by way of limitation, in response to the text query, "friends like facebook," the social-networking system 160 may generate a structured query "My friends who like Facebook". In this example, the references in the structured query to "friends," "like," and "Facebook" are social-graph tokens corresponding to particular social-graph elements as described previously (i.e., a "friend" edge 206, a "like" edge 206, and a "Facebook" concept node 204). Similarly, the references to "my" and "who" are grammar tokens, which are included in the structured query so that it is rendered in a natural-language syntax. In particular embodiments, the social-networking system 160 may generate a plurality of structured queries, where the structured queries may comprise references to different identified concept nodes 204 or different identified edges 206. As an example and not by way of limitation, continuing with the previous example, in addition to the structured query "My friends who like Facebook," the social-networking system 160 may also generate a structured query "My friends who like Facebook Culinary Team," where "Facebook Culinary Team" in the structured query is a query token corresponding to yet another social-graph element. In particular embodiments, social-networking system 160 may rank the generated structured queries. The structured queries may be ranked based on a variety of factors. In particular embodiments, the social-networking system 160 may ranks structured queries based on advertising sponsorship. An advertiser (such as, for example, the user or administrator of a particular profile page corresponding to a particular node) may sponsor a particular node such that a structured query referencing that node may be ranked more highly. Although this disclosure describes generating particular structured queries in a particular manner, this disclosure contemplates generating any suitable structured queries in any suitable manner.

In particular embodiments, social-networking system 160 may calculate a quality score for a structured query based on the text query and the structured query. The quality score may be, for example, a confidence score, a probability, a quality, a ranking, another suitable type of score, or any combination thereof. As an example and not by way of limitation, when determining a quality score, s, for a structured query, social-networking system 160 may factor in the text query received from the querying user and the structured query generated in response to the text query. Thus, the quality score corresponding to a particular structured query, s, given a particular search query, X, and the particular structured query, Q, may be calculated as s=(X, Q). The quality score may be calculated in a variety of ways and using a variety of factors. As an example and not by way of limitation, the quality score for a structured query may be calculated based in part on one or more of the generation cost, the normalized cost, the grammar-insertion cost, the entity-numerosity cost, the language-model score, the entity-insertion cost, other suitable factors, or any combination thereof. In particular embodiments, social-networking system 160 may calculate the quality score for a structured query based on the generation cost of the structured query. A cost may be associated with each query token used to generate a structured query. As more query tokens are used to construct the structured query, the cost of the query may increase. Furthermore, different query tokens and types of tokens may have different costs. When generating a set of structured queries in response to a text query, social-networking system 160 may attempt to generate structured queries having the lowest generation cost possible. This may be done, for example, similarly to, or in conjunction with, selecting grammars from the grammar model. Grammars having lower-cost multi-paths may generate structured queries having lower generation costs, where the shortest-path grammar should produce the structured query having the lowest generation cost. Although this disclosure describes determining quality scores for particular structured queries in a particular manner, this disclosure contemplates determining quality scores for any suitable structured queries in any suitable manner.

In particular embodiments, social-networking system 160 may calculate the quality score for a structured query based on a normalized cost of the structured query. The number of terms in the text query received from the querying user (e.g., the number of identified n-grams in the text query) should normally be proportional to the number of query tokens in the structured query generated in response to that text query. Ideally, the ratio of n-grams to query tokes should approach unity (1:1). Thus, if the grammar model parses the text query and generates a structured query having substantially more query tokens than expected, it is likely that the structured query is of low quality. In other words, if the grammar model has to insert a significant number of query tokens in order to identify a grammar that matches the text query, then the structured query generated by that grammar is likely of low quality. Similarly, for longer text queries, it is expected that the structured query generated in response to the text query would contain more query tokens, and thus have a higher generation cost. Thus, the cost for generating the structured query may be normalized based on the length of the text query, such that high-cost structured queries may be identified as being of low quality if the cost is disproportionate to the length of the text query. Structured queries having high normalized costs indicate that they are of low quality, such that a high normalize cost correlates to a low quality score. In particular embodiments, social-networking system 160 may determine the number of n-grams in the text query received from the querying user and determine the number of query tokens in the structured query. Social-networking system 160 may then calculate a normalized cost based on the ratio of the number of n-grams in the text query to the number of query tokens in the structured query. As an example and not by way of limitation, for the text query "friends stanford", social-networking system 160 may generate a structured query such as "Friends who go to Stanford University", as illustrated in FIG. 4B. Social-networking system 160 may then determine that the text query has two n-grams: "friends" and "stanford", which were parsed by the grammar model to generate a structured query having three query tokens: [friends], [who go to], and [Stanford University]. Thus, the grammar model inserted a single query token, [who go to], in order to match the text query to string. Since the ratio of query tokens to n-grams in the text query is relatively low (3:2), this structured query may have a relatively low normalized cost, indicating it is a relatively high-quality structured query. As another example and not by way of limitation, in response to the text query "friends stanford", social-networking system 160 may generate a structured query such as "People who are friends with people who go to Stanford University". In this case, the structured query contains significantly more query tokens than the prior example. When the cost of generating this structured query is normalized based on the number of n-grams in the text query, it will have a high normalized cost, which indicates it should have a low quality score and thus should be filtered out.

Although this disclosure describes calculating quality scores for structured queries in a particular manner, this disclosure contemplates calculating quality scores for structured queries in any suitable manner.

In particular embodiments, social-networking system 160 may calculate the quality score for a structured query based on a grammar-insertion cost of the structured query. When generating a structured query using the grammar model, the number of grammar tokens inserted to generate the structured query should ideally be minimized. Thus, if the grammar model parses the text query and generates a structured query having significantly more grammar tokens than expected, it is likely that the structured query is of low quality. In other words, if the grammar model has to insert a significant number of grammar tokens in order to identify a grammar that matches the text query (and thus render the structured query in a natural-language syntax), then the structured query generated by that grammar is likely of low quality. Structured queries having high grammar-insertion costs (i.e., the cost associated with inserting grammar tokens into the structured query) indicate that they are of low quality, such that a high grammar-insertion cost correlates to a low quality score. In particular embodiments, social-networking system 160 may determine a number of n-grams in the text query received from the querying user, and determine a number of grammar tokens and social-graph tokens in the structured query. Social-networking system 160 may then calculate a grammar-insertion cost based on the ratio of the number of grammar tokens to the number of social-graph tokens normalized by the number of n-grams. As an example and not by way of limitation, for the text query "girls i have dated", social-networking system 160 may generate a structured query such as "Female users I have been friends with who like the Dating app". Here, the n-gram "girls" matches to the query token [Female users] and the n-gram "dated" matches to [Dating app] (albeit, this itself may be a low-quality match). However, in order to match the n-gram "i have", the grammar model has to insert the grammar tokens [I have been], [friends with], and [who like]. Thus, there is a high grammar insertion cost associated with this structured query because of the relatively high number of grammar tokens inserted in order to generate the query, indicating it is a relatively low-quality structured query. Although this disclosure describes calculating quality scores for structured queries in a particular manner, this disclosure contemplates calculating quality scores for structured queries in any suitable manner.

In particular embodiments, social-networking system 160 may calculate the quality score for a structured query based on an entity-numerosity cost of the structured query. When generating a structured querying using the grammar model, some, but not all, of the social-graph tokens should correspond to nodes of the social graph 200. When parsing a typical unstructured text query, it is expected that the structured query generated based on the text query should include a variety of query tokens, including some grammar tokens, some social-graph tokens for edges 206 or edge-types, and some social-graph tokens for user nodes 202 or concept nodes 204. However, if the parsing matches too many terms to nodes, or otherwise produces a structured query with a relatively large number of query tokens corresponding to nodes, it is likely that some of those nodes are false matches which don't match the query intent of the querying user. In other words, if a suggested structured query contains references to too many nodes, it is likely of low quality. Structured queries having high entity-numerosity costs (i.e., the cost associated with inserting social-graph tokens corresponding to nodes relatively to the other query tokens) indicate that they are of low quality, such that a high entity-numerosity cost correlates to a low quality score. In particular embodiments, social-networking system 160 may determine a number of social-graph tokens that correspond to nodes in the structured query. Social-networking system 160 may then calculated an entity-numerosity cost based on the number of social-graph tokens in the structured query. As an example and not by way of limitation, for the text query "girls i have dated from stanford", social-networking system 160 may generate a structured query such as "People from Stanford, California who like the 'Girls I Have Dated' page". Here, the structured query includes social-graph tokens for the city [Stanford, California] and the page [Girls I Have Dated], each of which corresponds to a particular concept node 204 of social graph 200. Thus, the n-gram "from stanford" is being matched by the grammar model to the query tokens [People from][Stanford, California], and the n-gram "girls i have dated" is being matched to the social-graph token for the concept node 204 corresponding to the page [Girls I Have Dated] (note that this itself may be a low-quality match). Relative to the length of the text query, the structured query contains a large number of social-graph tokens for nodes. Furthermore, a single token, [Girls I Have Dated] is being matched to a large portion of the unstructured text query. Thus, there is a high entity-numerosity cost associated with this structured query because of the relatively high number of social-graph tokens for nodes inserted in order to generate the query, indicating it is a relatively low-quality structured query. Although this disclosure describes calculating quality scores for structured queries in a particular manner, this disclosure contemplates calculating quality scores for structured queries in any suitable manner.

In particular embodiments, social-networking system 160 may calculate the quality score for a structured query based on a language-model score. The language-model score may be calculated with respect to the identified terms of the original text query as compared with the query tokens of the structured query. After generating a particular structured query, social-networking system 160 may analyze each query token and the query tokens adjacent to it in the structured query (e.g., the preceding or succeeding tokens) based on the sequence of the terms corresponding to those query tokens from the original text query. The probability that the tokens should appear with one or more of the adjacent tokens in the sequence from the original text query can then be analyzed. If the grammar model has inserted query tokens that are unlikely to appear together with adjacent query tokens in the original text query, then the structured query is likely of low quality. Structured queries having low language-model scores (i.e., there are query tokens with low probabilities of appearing together) indicate that they are of low quality, such that a low language-model score correlates to a low quality score. As an example and not by way of limitation, social-networking system 160 may determine a probability, p, of a particular query token being paired with particular adjacent terms from the original query. This calculation may factor in the sequence of terms in the original text query. Thus, the probability that a particular parsing corresponds to a particular query token pairing may be may be calculated as $p = (t_1 | t_2, \ldots, t_x)$, where $t_1$ is the query token being analyzed and $t_2 \ldots t_x$ are the adjacent query tokens 2 to x in the original text query. The individual probabilities for each query token may then be used to determine the overall language-model score for a structured query. In particular embodiments, social-networking system 160 may determine a probability, for each query token of a structured query, that the query token would appear with the adjacent query tokens in the original text query. Social-networking system 160 may then calculate a language-model score based on the probabilities for the query tokens. As an example and not by way of limitation, for the text query "girls i have dated", social-networking system 160 may generate a structured query such as "Female users I have who use the Dating app", where the Dating app is a hypothetical application associated with the online social network with an entity-type [application] (i.e., it corresponds to a non-terminal token [application]). To calculate the probability for the query token [Dating app], social-networking system 160 may then analyze the other query tokens from the structured query that correspond to adjacent terms in the original text query. In this case, social-networking system 160 may determine the probability that it would be used the query tokens [Female], [I], and [have] (which correspond to the terms "girls", "i", and "have" from the original text query, respectively) with the query token [Dating app] (or possibly the probability of using the non-terminal token [application]). This probability may be calculated as p=([Dating app]|([Female], [I], [have])), or the probability of inserting the query token [Dating app] given the preceding query tokens [Female], [I], and [have] (alternatively, the probability may be calculated as p=([application]|([Female], [I], [have]))). In this case, there may be a low probability that the query tokens [Female], [I], and [have] would be used before the social-graph token [Dating app], and thus this structured query would have a relatively low language-model score, indicating it is a relatively low-quality structured query. Although this disclosure describes calculating quality scores for structured queries in a particular manner, this disclosure contemplates calculating quality scores for structured queries in any suitable manner.

In particular embodiments, social-networking system 160 may calculate the quality score for a structured query based on an entity-insertion cost of the structured query. When parsing a particular text query, the terms in the text query (e.g., the n-grams in the text query) should match the query token in the generated structured query as closely as possible. Thus, changes to the terms or the addition of terms should increase the cost of generating that particular query token, such that a structured query containing such modified tokens may be of low quality. Structured queries having high entity-insertion costs (i.e., the cost associated with inserting or modifying terms from the text query to make it match a particular query token) indicate that they may be of low quality, such that a high entity-insertion cost correlates with a low quality score. In particular embodiments, social-networking system 160 may determine, for each social-graph token in the structured query, the number of terms inserted by the grammar to match the social-graph token with its corresponding n-gram. As an example and not by way of limitation, for the text query "girls who like dating", social-networking system 160 may generate the structured query "Female users who like the 'Dating in Palo Alto' app". Thus, the term "dating" from the text query has been parsed by the grammar model and matched to the query token for [Dating in Palo Alto] (which may correspond to a particular concept node 204 for an app). However, in order to make the term "dating" match this query token, social-networking system 160 had to insert the addition terms "in Palo Alto" to match with the query token [Dating in Palo Alto]. Thus, there is a high entity-insertion cost associated with this structured query because of the relatively high number of terms inserted by the grammar model to make the n-gram from the text query match the query token in the structured query, indicating that it is a relatively low-quality structured query. Although this disclosure describes calculating quality scores for structured queries in a particular manner, this disclosure contemplates calculating quality scores for structured queries in any suitable manner.

In particular embodiments, social-networking system 160 may send one or more of the structured queries to the querying user. As an example and not by way of limitation, after the structured queries are generated, the social-networking system 160 may send one or more of the structured queries as a response (which may utilize AJAX or other suitable techniques) to the user's client system 130 that may include, for example, the names (name strings) of the referenced social-graph elements, other query limitations (e.g., Boolean operators, etc.), as well as, potentially, other metadata associated with the referenced social-graph elements. The web browser 132 on the querying user's client system 130 may display the sent structured queries in a drop-down menu 300, as illustrated in FIGS. 4A-4B. In particular embodiments, social-networking system 160 may send to the first/querying user one or more of the structured queries from the post-filtered first set. Each structured query sent to the first user may have a quality score greater than or equal to a threshold quality score. In this way, low-quality structured queries may be filtered out (i.e., removed from the set of structured queries generated for the user). The remaining structured queries after filtering (if any) may then be ranked and one or more of these may then be sent to the querying user. In particular embodiments, if fewer than a threshold number of structured queries remain after filtering, then social-networking system 160 may generate a web search query based on the text query. In this way, if the grammar model fails to produce relevant queries, the querying user is still left with an option for performing a search. As an example and not by way of limitation, for the text query "girls i have dated", social-networking system 160 may generate very few, or even zero, structured queries of sufficient quality to send to the querying user as suggested queries. As described previously, the parsing of this text query may produce a variety of low-quality structured queries, each of which may be filtered out by social-networking system 160. Consequently, social-networking system 160 may instead send a suggested query for performing a web search, such as, for example, "Search the web for 'girls i have dated'". If the user selected this suggested query, the query may be transmitted to a web search engine (e.g., BING, GOOGLE, etc.) via an appropriate API, where a standard string-matching search may be performed. Results may then be sent back to the social-networking system 160 (e.g., via an API) for display to the querying user. Alternatively, when the querying user selects the web search option, the user's web browser 132 may be redirect to the webpage for the search engine. In particular embodiments, the sent queries may be presented to the querying user in a ranked order, such as, for example, based on a rank previously determined as described above. Structured queries with better rankings may be presented in a more prominent position. Furthermore, in particular embodiments, only structured queries above a threshold rank may be sent or displayed to the querying user. As an example and not by way of limitation, as illustrated in FIGS. 4A-4B, the structured queries may be presented to the querying user in a drop-down menu 300 where higher ranked structured queries may be presented at the top of the menu, with lower ranked structured queries presented in descending order down the menu. In the examples illustrated in FIGS. 4A-4B, only the seven highest ranked queries are sent and displayed to the user. However, in these examples if there are fewer than seven structured queries available to send to the user (e.g., because some of have been filtered out due to low quality), then only the available structured queries may be sent. Furthermore, when there are fewer than seven structured queries, social-networking system 160 may include a suggested web search query in the set of suggested queries sent to the querying user. In particular embodiments, one or more references in a structured query may be highlighted (e.g., outlined, underlined, circled, bolded, italicized, colored, lighted, offset, in caps) in order to indicate its correspondence to a particular social-graph element. As an example and not by way of limitation, as illustrated in FIGS. 4A-4B, the references to "Stanford University" and "Stanford, California" are highlighted (outlined) in the structured queries to indicate that it corresponds to a particular concept node 204. Similarly, the references to "Friends", "like", "work at", and "go to" in the structured queries presented in drop-down menu 300 could also be highlighted to indicate that they correspond to particular edges 206. Although this disclosure describes sending particular structured queries in a particular manner, this disclosure contemplates sending any suitable structured queries in any suitable manner.

In particular embodiments, social-networking system 160 may receive from the querying user a selection of one of the structured queries. Alternatively, the social-networking system 160 may receive a structured query as a query selected automatically by the system (e.g., a default selection) in certain contexts. The nodes and edges referenced in the received structured query may be referred to as the selected nodes and selected edges, respectively. As an example and not by way of limitation, the web browser 132 on the querying user's client system 130 may display the transmitted structured queries in a drop-down menu 300, as illustrated in FIGS. 4A-4B, which the user may then click on or otherwise select (e.g., by simply keying "enter" on his keyboard) to indicate the particular structured query the user wants the social-networking system 160 to execute. Upon selecting the particular structured query, the user's client system 130 may call or otherwise instruct to the social-networking system 160 to execute the selected structured query. As an example and not by way of limitation, in response to a selection of a particular structured query, social-networking system 160 may generate a query command based on the structured query, which may then be sent to one or more data stores 164 to search for content objects that match the constraints of the query command. Although this disclosure describes receiving selections of particular structured queries in a particular manner, this disclosure contemplates receiving selections of any suitable structured queries in any suitable manner.

Figure 5:
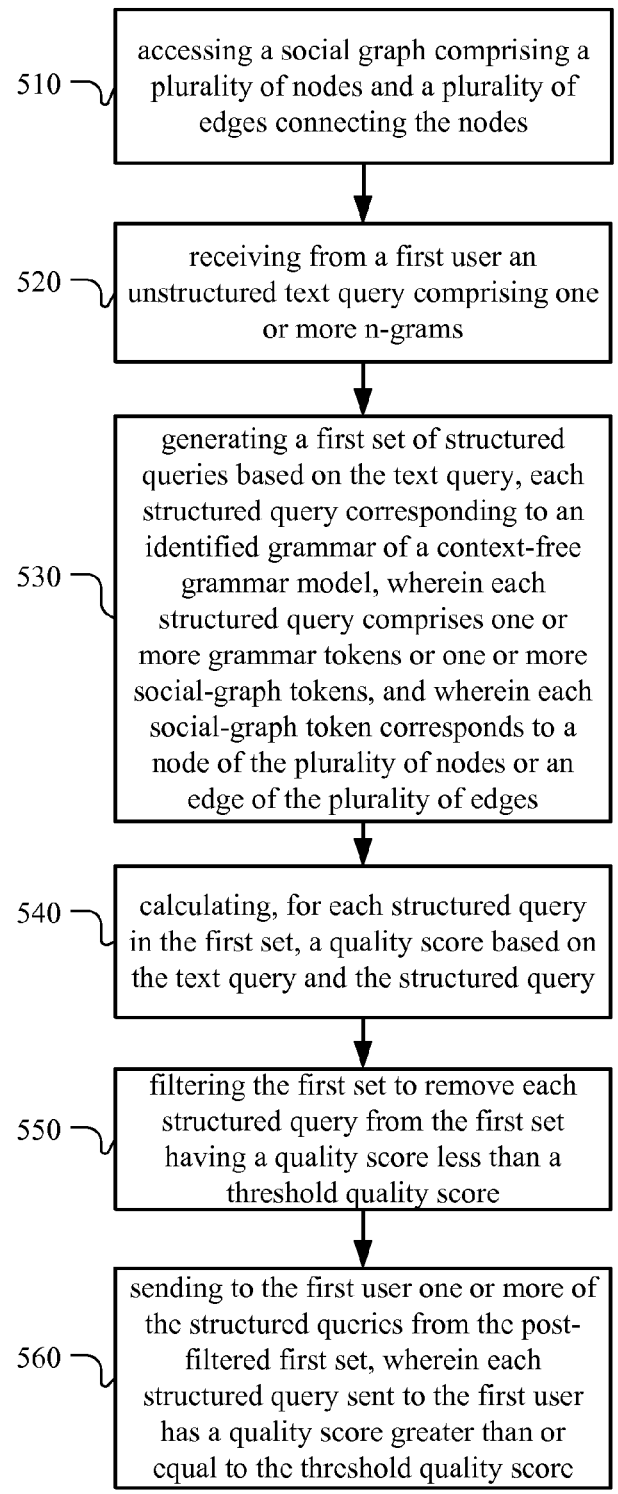
FIG. 5 illustrates an example method for filtering suggested structured queries on an online social network.

FIG. 5 illustrates an example method 500 for filtering suggested structured queries on an online social network. The method may begin at step 510, where social-networking system 160 may access a social graph 200 comprising a plurality of nodes and a plurality of edges 206 connecting the nodes. The nodes may comprise a first node 202 and a plurality of second nodes (one or more user nodes 202, concepts nodes 204, or any combination thereof). At step 520, social-networking system 160 may receive from the first user an unstructured text query. The text query may comprise one or more n-grams. At step 530, social-networking system 160 may generate a first set of structured queries based on the text query. Each structured query in the first set may correspond to an indentified grammar of a context-free grammar model. Each structured query may also comprise one or more grammar tokens or one or more social-graph tokens. Each social-graph token may correspond to a node of the plurality of nodes or an edge of the plurality of edges. At step 540, social-networking system 160 may calculate, for each structured query, a quality score based on the text query and the structured query. The quality score may be calculated in any suitable manner described herein. At step 550, social-networking system 160 may filtering the first set to remove each structured query from the first set having a quality score less than a threshold quality score. At step 560, social-networking system 160 may send to the first user one or more of the structured queries from the post-filtered first set. Each structured query sent to the first user may have a quality score greater than or equal to the threshold quality score. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Systems and Methods

Figure 6:
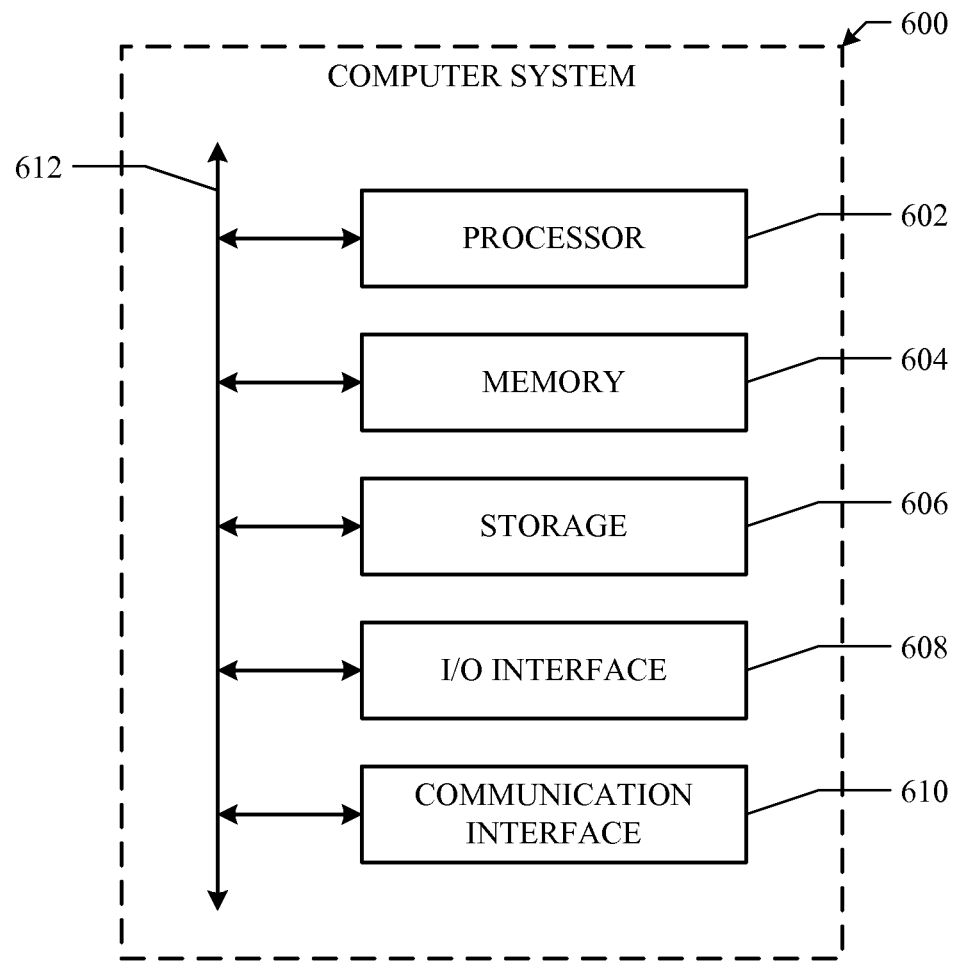
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing device:
   accessing a social graph comprising a plurality of nodes and a plurality of edges connecting the nodes, each of the edges between two of the nodes representing a single degree of separation between them, the nodes comprising:
      a first node corresponding to a first user associated with an online social network; and
      a plurality of second nodes that each correspond to a concept or a second user associated with the online social network;
   receiving, from a client device of the first user, an unstructured text query inputted by the first user;
   generating a first set of structured queries based on the text query, each structured query in the first set corresponding to a grammar of a context-free grammar model, wherein each structured query in the first set is based on a natural-language string generated by a grammar of the context-free grammar model and comprises one or more grammar tokens and one or more social-graph tokens, and wherein each social-graph token corresponds to a node of the plurality of nodes or an edge of the plurality of edges;
   calculating, for each structured query in the first set, a quality score based on the text query and the structured query;
   filtering the first set to remove each structured query from the first set having a quality score less than a threshold quality score; and
   sending, to the client device of the first user, one or more of the structured queries from the post-filtered first set, wherein each structured query sent to the first user has a quality score greater than or equal to the threshold quality score.

2. The method of claim 1, wherein calculating a quality score comprises, for each structured query:
   determining a first number of n-grams in the text query;
   determining a second number of query tokens in the structured query; and
   calculating a normalized cost based on the ratio of the first number to the second number, wherein the quality score is based on the normalized cost.

3. The method of claim 1, wherein calculating a quality score comprises, for each structured query:
   determining a first number of n-grams in the text query;
   determining a second number of grammar tokens in the structured query;
   determining a third number of social-graph tokens in the structured query; and
   calculating a grammar-insertion cost based on the ratio of the second number to the third number normalized by the first number, wherein the quality score is based on the grammar-insertion cost.

4. The method of claim 1, wherein calculating a quality score comprises, for each structured query:
  determining a first number of social-graph tokens corresponding to nodes in the structured query; and
  calculating an entity-numerosity cost based on the first number, wherein the quality score is based on the entity-numerosity cost.

5. The method of claim 1, wherein calculating a quality score comprises, for each structured query:
  for each query token of the structured query, wherein the query token corresponds to a first term of the text query, determining a probability that the query token pairs with one or more other query tokens of the structured query that correspond to one or more second terms of the text query, wherein the one or more second terms are adjacent to the first term in the text query; and
  calculating a language-model score based on the probabilities for each query token, wherein the quality score is based on the language-model score.

6. The method of claim 1, wherein:
  the text query comprises one or more n-grams, and wherein each social-graph token corresponds to at least one of the n-grams; and
  calculating an entity-insertion cost for each social-graph token based on a first number of terms inserted by the grammar to match the social-graph token with its corresponding n-gram, wherein the quality score is based on the entity-insertion cost.

7. The method of claim 1, wherein if fewer than a threshold number of structured queries remain after filtering the first set, then generating a web search query based on the text query.

8. The method of claim 1, further comprising:
  identifying one or more edges or one or more second nodes, each of the identified edges or identified nodes corresponding to at least a portion of the unstructured text query;
  accessing a context-free grammar model comprising a plurality of grammars, each grammar comprising one or more query tokens, wherein each query token is a grammar or a social-graph token; and
  identifying one or more grammars, each identified grammar having one or more query tokens corresponding to at least one of the identified second nodes or identified edges.

9. The method of claim 8, further comprising:
  determining a first score for each identified grammar; and
  wherein each structured query in the first set corresponds to an identified grammar having first score greater than a grammar-threshold score, wherein the structured query is based on a string generated by the identified grammar, each structured query comprising the query tokens of the corresponding identified grammar, wherein one or more of the query tokens of the structured query corresponds to at least one of the identified second nodes or identified edges.

10. The method of claim 8, wherein the text query comprises one or more n-grams, and wherein each of the identified edges or identified nodes corresponds to at least one of the n-grams.

11. The method of claim 10, wherein each n-gram comprises one or more characters of text entered by the first user.

12. The method of claim 10, wherein each n-gram comprises a contiguous sequence of n items from the text query.

13. The method of claim 10, wherein identifying one or more edges or second nodes comprises:
  determining a second score for each n-gram that the n-gram corresponds to an edge or a second node;
  selecting one or more edges having a second score greater than an edge-threshold score, each of the identified edges corresponding to at least one of the n-grams; and
  selecting one or more second nodes having a second score greater than a node-threshold score, each of the identified second nodes being connected to at least one of the identified edges, each of the identified second nodes corresponding to at least one of the n-grams.

14. The method of claim 13, wherein the second score for each n-gram is a probability that the n-gram corresponds to an edge or a second node.

15. The method of claim 1, wherein the structured queries are sent to a interface associated with a query field for display to the first user.

16. The method of claim 1, wherein the text query is inputted by the first user at a query field of a webpage or a native application associated with the online social network.

17. The method of claim 1, further comprising:
  receiving, from the client device of the first user, a selection of one of the structured queries; and
  generating one or more search results matching the selected structured query, the one or more search results corresponding to one or more second nodes, respectively, each second node being connected by an edge corresponding to one of the social-graph tokens of the selected structured query to one of a node corresponding to one of the social-graph tokens of the selected structured query.

18. The method of claim 1, wherein, for each structured query sent to the first user, the grammar used to generate the structured query comprises one or more query tokens corresponding to one or more identified nodes or identified edges, each of the identified nodes or identified edges corresponding to at least a portion of the text query.

19. One or more computer-readable non-transitory storage media embodying software that is operable when executed to:
  access a social graph comprising a plurality of nodes and a plurality of edges connecting the nodes, each of the edges between two of the nodes representing a single degree of separation between them, the nodes comprising:
    a first node corresponding to a first user associated with an online social network; and
    a plurality of second nodes that each correspond to a concept or a second user associated with the online social network;
  receive, from a client device of the first user, an unstructured text query inputted by the first user;
  generate a first set of structured queries based on the text query, each structured query in the first set corresponding to a grammar of a context-free grammar model, wherein each structured query in the first set is based on a natural-language string generated by a grammar of the context-free grammar model and comprises one or more grammar tokens and one or more social-graph tokens, and wherein each social-graph token corresponds to a node of the plurality of nodes or an edge of the plurality of edges;
  calculate, for each structured query in the first set, a quality score based on the text query and the structured query;
  filter the first set to remove each structured query from the first set having a quality score less than a threshold quality score; and send, to the client device of the first user, one or more of the structured queries from the post-filtered first set, wherein each structured query sent to the first user has a quality score greater than or equal to the threshold quality score.

20. A system comprising: one or more processors; and a memory coupled to the processors comprising instructions executable by the processors, the processors operable when executing the instructions to:

- access a social graph comprising a plurality of nodes and a plurality of edges connecting the nodes, each of the edges between two of the nodes representing a single degree of separation between them, the nodes comprising:
  - a first node corresponding to a first user associated with an online social network; and
  - a plurality of second nodes that each correspond to a concept or a second user associated with the online social network;
- receive, from a client device of the first user, an unstructured text query inputted by the first user;
- generate a first set of structured queries based on the text query, each structured query in the first set corresponding to a grammar of a context-free grammar model, wherein each structured query in the first set comprises is based on a natural-language string generated by a grammar of the context-free grammar model and one or more grammar tokens and one or more social-graph tokens, and wherein each social-graph token corresponds to a node of the plurality of nodes or an edge of the plurality of edges;
- calculate, for each structured query in the first set, a quality score based on the text query and the structured query;
- filter the first set to remove each structured query from the first set having a quality score less than a threshold quality score; and
- send, to the client device of the first user, one or more of the structured queries from the post-filtered first set, wherein each structured query sent to the first user has a quality score greater than or equal to the threshold quality score.

\* \* \* \* \*